(12) United States Patent
Wang (10) Patent No.: US 12,395,579 B2
(45) Date of Patent: Aug. 19, 2025

(54) DISPLAY DEVICE

(71) Applicant: Wuhan China Star Optoelectronics Semiconductor Display Technology Co., Ltd., Hubei (CN)

(72) Inventor: Wenqiang Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/761,224

(22) PCT Filed: Jan. 28, 2022

(86) PCT No.: PCT/CN2022/074673
§ 371 (c)(1),
(2) Date: Jul. 27, 2023

(87) PCT Pub. No.: WO2023/137793
PCT Pub. Date: Jul. 27, 2023

(65) Prior Publication Data
US 2024/0048646 A1    Feb. 8, 2024

(30) Foreign Application Priority Data
Jan. 21, 2022   (CN) .......................... 202210069542.9

(51) Int. Cl.
*H04M 1/02*  (2006.01)
*H04N 23/51*  (2023.01)
*H04N 23/57*  (2023.01)

(52) U.S. Cl.
CPC .......... *H04M 1/0264* (2013.01); *H04N 23/51* (2023.01); *H04N 23/57* (2023.01)

(58) Field of Classification Search
CPC .... H04M 1/0264; H04M 1/0266; H04M 1/18; H04N 23/51; H04N 23/57; H04N 23/00; G09F 9/301; G09F 9/33
See application file for complete search history.

(56) References Cited

U.S. PATENT DOCUMENTS

| | | | |
|---|---|---|---|
| 2013/0222609 A1* | 8/2013 | Soffer ..................... | G06F 21/81 |
| | | | 348/207.1 |
| 2020/0196142 A1* | 6/2020 | Yang ..................... | H04W 12/02 |
| 2021/0407389 A1 | 12/2021 | Luo et al. | |
| 2022/0163869 A1* | 5/2022 | Niu ........................ | G06F 1/1616 |
| 2022/0269149 A1* | 8/2022 | Stone .................... | G03B 17/565 |
| 2022/0286545 A1* | 9/2022 | Koch ..................... | G06F 1/1637 |

(Continued)

FOREIGN PATENT DOCUMENTS

| | | |
|---|---|---|
| CN | 108769305 | 11/2018 |
| CN | 210093271 | 2/2020 |
| CN | 111739414 | 10/2020 |

(Continued)

*Primary Examiner* — Timothy J Henn (57) ABSTRACT

The present application provides a display device. In the display device, a frame structure, a cover plate, and a backplate define a space. A camera module, a panel, and a driving assembly are arranged in the space. The driving assembly is connected to the panel, and the driving assembly is used for driving the panel to cover the camera module. When the display device is in a non-camera mode, the panel covers the camera module. When the display device is in a camera mode, the camera module is exposed.

18 Claims, 10 Drawing Sheets

(56) References Cited

U.S. PATENT DOCUMENTS

2023/0106722 A1* 4/2023 Huang .................. H04N 23/51
                                                                              348/373

FOREIGN PATENT DOCUMENTS

| CN | 111756961 | 10/2020 |
| CN | 111970392 | 11/2020 |
| CN | 212061677 | 12/2020 |
| CN | 212850723 | 3/2021 |
| CN | 112929540 | 6/2021 |
| CN | 113393769 | 9/2021 |
| CN | 113596203 | 11/2021 |
| CN | 113689790 | 11/2021 |
| CN | 113689791 | 11/2021 |
| CN | 113873065 | 12/2021 |
| JP | 2011-237716 | 11/2011 |
| KR | 10-2020-0014015 | 2/2020 |
| WO | WO 2021/184798 | 9/2021 |

* cited by examiner

DISPLAY DEVICE

RELATED APPLICATIONS

This application is a National Phase of PCT Patent Application No. PCT/CN2022/074673 having International filing date of Jan. 28, 2022, which claims the benefit of priority of Chinese Patent Application No. 202210069542.9 filed on Jan. 21, 2022. The contents of the above applications are all incorporated by reference as if fully set forth herein in their entirety.

FIELD AND BACKGROUND OF THE INVENTION

The present application relates to a field of display technology and in particular, to a display device.

In recent years, flexible organic light-emitting diode (OLED) panel technology has developed rapidly, and the look of mobile phones constantly has innovative designs. High screen ratios, full-screen display, dust-proof and water-proof mobile phones have always been in great demand. At present, in order to realize the full-screen display of mobile terminal products, manufacturers adopt two solutions, including a lift-type under-screen camera technology with a lift-type motor and an OLED module screen display technology with no camera holes, that is, the under-screen camera technology.

During research and practice of conventional techniques, the inventor of the present application found that the lift-type under-screen camera technology needs to directly lift a camera out of a middle frame structure of a mobile phone. Such a design occupies a large structural space and a motor consumes a lot of power. The main problem is poor dust and water resistant. The camera is exposed outside, and moisture and dust can easily enter a middle frame along a gap and cause circuit damage. In addition, if the mobile phone is dropped, the camera is easily damaged.

SUMMARY OF THE INVENTION

The present application provides a display device, which can reduce a risk of moisture entering an inside of the display device.

The present application provides a display device with a camera mode and a non-camera mode, wherein the display device includes:
a frame structure;
a cover plate arranged on one side of the frame structure;
a backplate arranged on another side of the frame structure, wherein the frame structure, the cover plate, and the backplate define a space;
a camera module arranged in the space;
a panel disposed within the space; and
a driving assembly arranged in the space, wherein the driving assembly is configured to drive the panel to cover the camera module;
wherein when the display device is in a non-camera mode, the panel covers the camera module; and when the display device is in the camera mode, the camera module is exposed.

Optionally, in some embodiments of the present application, the driving assembly includes:
a connecting member connected to a back of the panel;
a latch disposed on one side of the connecting member away from the panel;
a socket disposed on the frame structure, wherein the socket is provided with a slot for engagement connection with the latch;
a driving member; and
a fastening member, wherein the driving member is connected to the fastening member, the driving member is arranged on one of the connecting member or the frame structure, and the fastening member is arranged on the other one of the connecting member or the frame structure.

Optionally, in some embodiments of the present application, the connecting member includes a first plate, a limiting wall, and a first guiding portion; the first plate is fixedly connected to the back of the panel; the limiting wall is arranged on one side of the first plate away from the panel; the first guiding portion is arranged on one side of the first plate away from the panel;

the frame structure includes a frame body, a first support portion, and a second guiding portion; the first support portion is connected in the frame body, and the second guiding portion is disposed on the first support portion; the first plate is disposed on the first support portion; a limiting opening is defined in the first support portion, and the limiting wall is arranged in the limiting opening; and the first guiding portion and the second guiding portion are slidably connected to each other.

Optionally, in some embodiments of the present application, the first guiding portion includes one of a guiding groove or a guiding block, and the second guiding portion includes the other one of the guiding groove or the guiding block.

Optionally, in some embodiments of the present application, the socket includes a first base and two resilient arms, the resilient arms are connected at two ends of one side of the first base close to the latch, the two resilient arms define the slot, the slot includes a first region close to the latch and a second region connected to one side of the first region away from the latch, and a width of the first region is less than a width of the second region;

the latch includes a second base and a pin connected to one side of the second base close to the socket, the pin includes a first portion connected to the second base and a second portion connected to one side of the first portion away from the second base, and a width of the first portion is less than a width of the second portion; and the first portion is matched with the first region, the second portion is matched with the second region, and the pin is engaged with the slot.

Optionally, in some embodiments of the present application, the frame structure further includes a second support portion, a positioning block is disposed on one side of the second support portion away from the cover plate, the first base is provided with a positioning groove, and the positioning block is arranged in the positioning groove; and
a protruding platform protrudes from one side of the first plate away from the cover plate, and the second base is disposed on the protruding platform.

Optionally, in some embodiments of the present application, a recessed portion is defined on one side of the second support portion close to the cover plate, the recessed portion is located on one side of the second support portion away from the first support portion, and the camera module is arranged in the recessed portion.

Optionally, in some embodiments of the present application, the driving member includes a housing, a motor, a screw rod connected to an output shaft of the motor, and a sleeve threadedly connected with the screw rod; the sleeve is fixedly connected to the fastening member;

the housing includes a first cavity and a second cavity communicating with the first cavity, the motor is arranged in the first cavity; the sleeve is inserted in the second cavity and is slidably connected with the second cavity; and the sleeve is provided with a threaded hole, and the screw rod is threadedly connected with the threaded hole.

Optionally, in some embodiments of the present application, the frame structure further includes a third support portion connected to one side of the first support portion away from the camera module; a hole is defined between one side of the third support portion, away from the camera module, and the frame body;

the display device includes a rotating shaft and an elastic member, the rotating shaft is disposed in the hole, the panel is a flexible panel, and the panel is disposed on the third support portion and is bent around an outer peripheral surface of the rotating shaft to one side of the third support portion away from the cover plate; the elastic member is disposed on one side of the third support portion away from the cover plate; and one end of the elastic member is connected to an end portion of the panel, and another end of the elastic member is fixedly connected to the frame structure.

Optionally, in some embodiments of the present application, the elastic member includes a first end portion, an elastic portion, and a second end portion which are connected in sequence, the first end portion is connected to the panel, and the second end portion is fixedly connected to the frame structure.

Optionally, in some embodiments of the present application, the display device further includes an auxiliary plate and a pressing plate; the auxiliary plate is disposed between the elastic member and the third support portion; the pressing plate is disposed between the elastic member and the backplate; and the auxiliary plate and the pressing plate press the second end portion of the elastic member and are fixedly connected to the frame structure.

Optionally, in some embodiments of the present application, the pressing plate includes a second plate and a pressing portion disposed on the second plate; the auxiliary plate includes a third plate and a pressing platform disposed on the third plate; and the second end portion of the elastic member is disposed between the pressing portion and the pressing platform.

Optionally, in some embodiments of the present application, the pressing portion and the pressing platform are disposed corresponding to the elastic member; a surface of the second plate facing the cover plate and a side surface of the pressing portion define a first recessed space; a surface of the third plate facing the backplate and a side surface of the pressing platform define a second recessed space; and the first recessed space and the second recessed space are defined corresponding to a portion of the panel close to the elastic member.

Optionally, in some embodiments of the present application, a first accommodating groove is defined on one side of the frame body away from the cover plate, and the pressing plate and the auxiliary plate are disposed in the first accommodating groove; and the pressing plate and the auxiliary plate are fixedly connected to the frame body through a plurality of threaded members.

Optionally, in some embodiments of the present application, a hollow opening is defined in the pressing plate, and the hollow opening exposes a portion of the elastic member and a portion of the panel.

Optionally, in some embodiments of the present application, sides of the pressing plate and the auxiliary plate facing the panel are made of a flexible material.

Optionally, in some embodiments of the present application, the frame structure further includes a limiting member, and the limiting member is disposed on an inner side of the frame body and is located on one side close to the cover plate;

a limiting space is formed between the limiting member and a surface of the third support portion close to the cover plate, and the panel is arranged in the limiting space; and one side of the limiting member facing the cover plate and an inner side surface of the frame body form a second accommodating groove, and the cover plate is arranged in the second accommodating groove.

Optionally, in some embodiments of the present application, one side of the frame body away from the cover plate is provided with a third accommodating groove, and the third accommodating groove communicates with two sides of the hole; and the display device includes guiding sleeves, the guiding sleeves are sleeved on two sides of the rotating shaft, and the guiding sleeves are installed in the third accommodating groove.

Optionally, in some embodiments of the present application, the display device further includes a rear camera module, a switching board, a button, an electronic device mounting board, a charging interface device, a mother circuit board, a first flexible circuit board, and a second flexible circuit board;

the mother circuit board is connected to the button through the first flexible circuit board; the mother circuit board is connected to the camera module and/or the rear camera module through the second flexible circuit; the switching board is disposed at one side of the mother circuit board; and the charging interface device is arranged at one side of the mother circuit board.

Advantages of the Present Application

In the present application, a frame structure, a cover plate, and a backplate are used to define a space. A camera module, a panel, and a driving assembly are arranged in the space. The driving assembly is connected to the panel, and the driving assembly is used to drive the panel to cover the camera module. When a display device is in a non-camera mode, the panel covers the camera module. When the display device is in a camera mode, the camera module is exposed.

That is to say, regardless of whether it is in the camera mode or in the non-camera mode, the driving assembly and the camera module are all arranged in the space, which reduces a risk of moisture entering the display device.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF SPECIFIC EMBODIMENTS OF THE INVENTION

Technical solutions of the present application are clearly and completely described below with reference to accompanying drawings and in conjunction with specific embodiments. Obviously, the described embodiments are only some of the embodiments of the present application, rather than all the embodiments. Based on the embodiments in the present application, all other embodiments obtained by those skilled in the art without creative work shall fall within the protection scope of the present application. In addition, it should be understood that the specific embodiments described herein are only used to illustrate and explain the present application, but not to limit the present application. In the present application, unless otherwise specified, directional terms such as "upper" and "lower" generally refer to upper and lower sides of a device in actual use or working state, specifically refer to directions in the accompanying drawings; while "inside" and "outside" are referred to with respect to outlines of the device.

The present application provides a display device, as described in detail below. It should be noted that a description order of the following embodiments is not intended to be a preference order of the embodiments.

Figure 1:
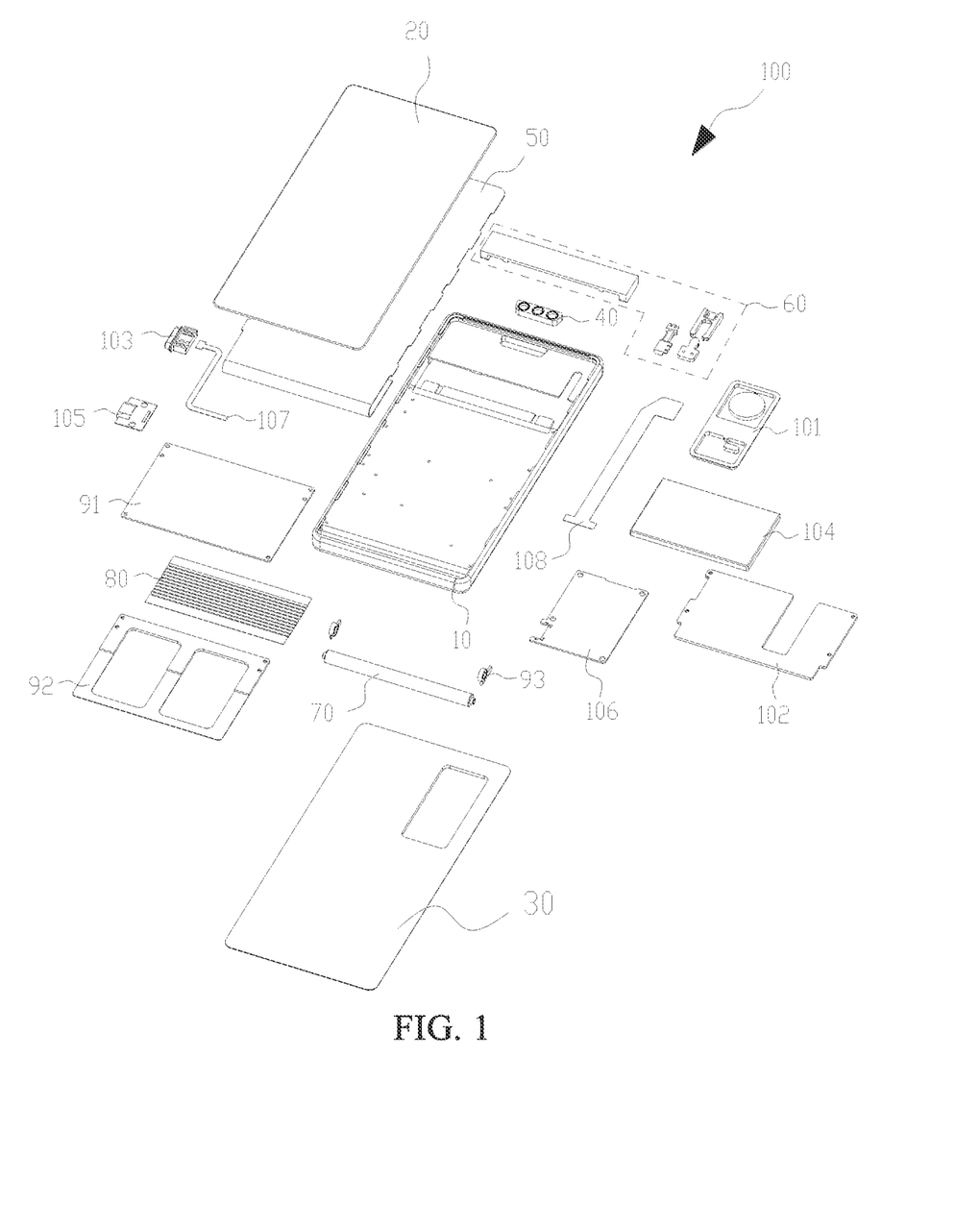
FIG. 1 is an exploded view illustrating a display device according to one embodiment of the present application.
Figure 2:
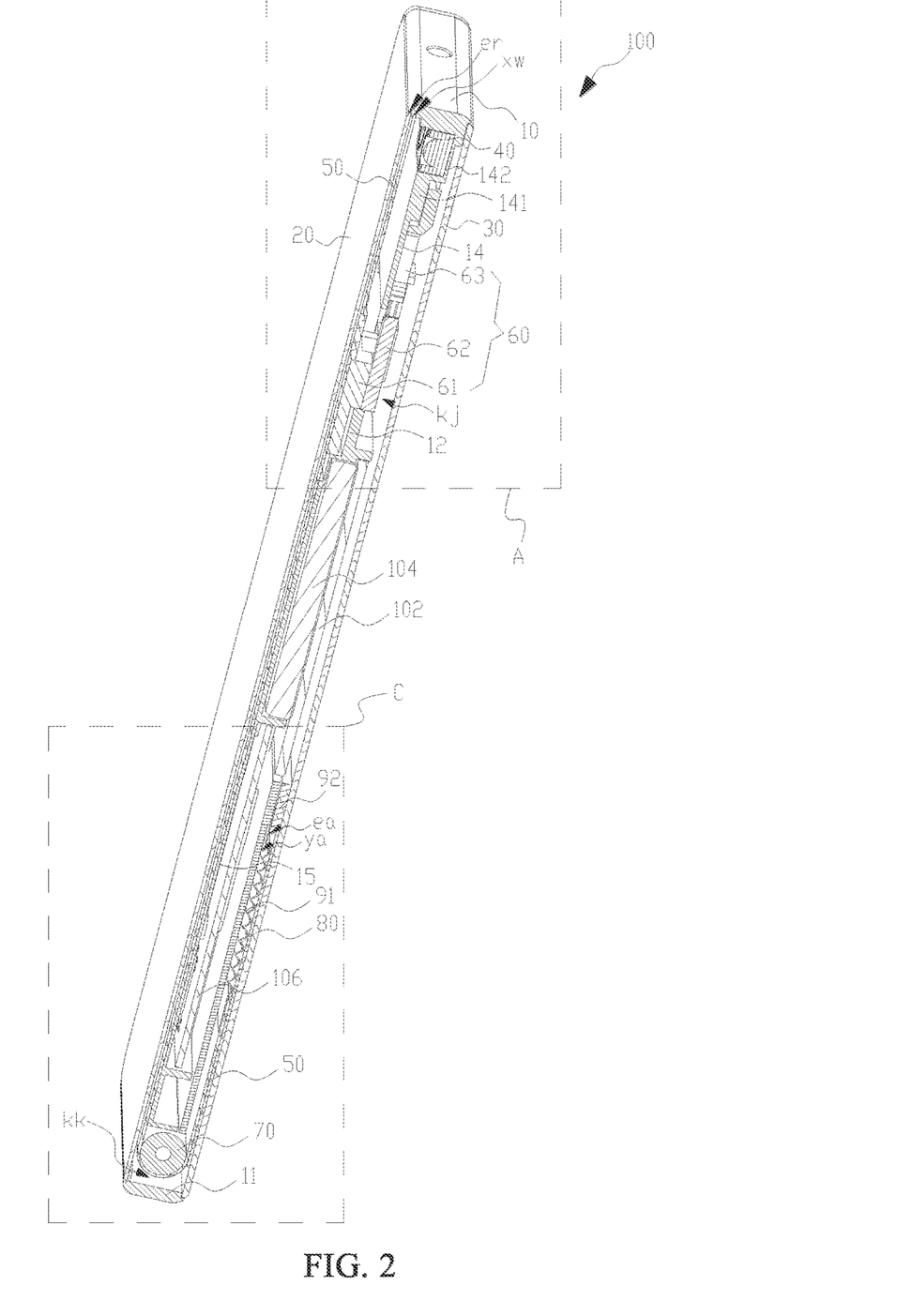
FIG. 2 is a schematic cross-sectional structural view of the display device according to one embodiment of the present application.

FIG. 1 and FIG. 2 show a display device 100 according to one embodiment of the present application. The display device 100 includes a camera mode and a non-camera mode. The display device 100 includes a frame structure 10, a cover plate 20, a backplate 30, a camera module 40, a panel 50, and a driving assembly 60.

The cover plate 20 is arranged on one side of the frame structure 10. The backplate 30 is arranged on another side of the frame structure 10. The frame structure 10, the cover plate 20, and the backplate 30 define a space kj.

The camera module 40 is arranged in the space kj. The panel 50 is arranged in the space kj. The driving assembly 60 is arranged in the space kj.

The driving assembly 60 is used for driving the panel 50 to cover the camera module 40.

Figure 3:
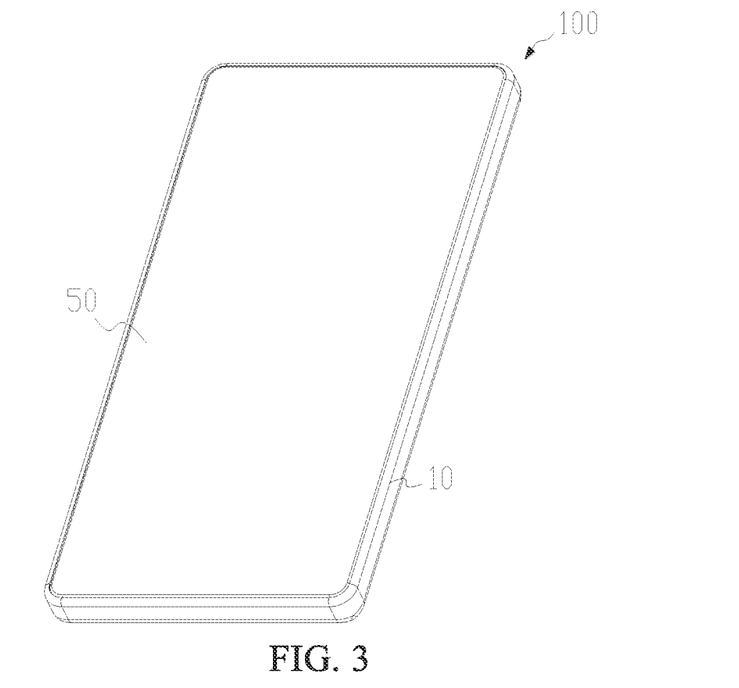
FIG. 3 is a schematic structural view illustrating the display device in a non-camera mode according to one embodiment of the present application.
Figure 4:
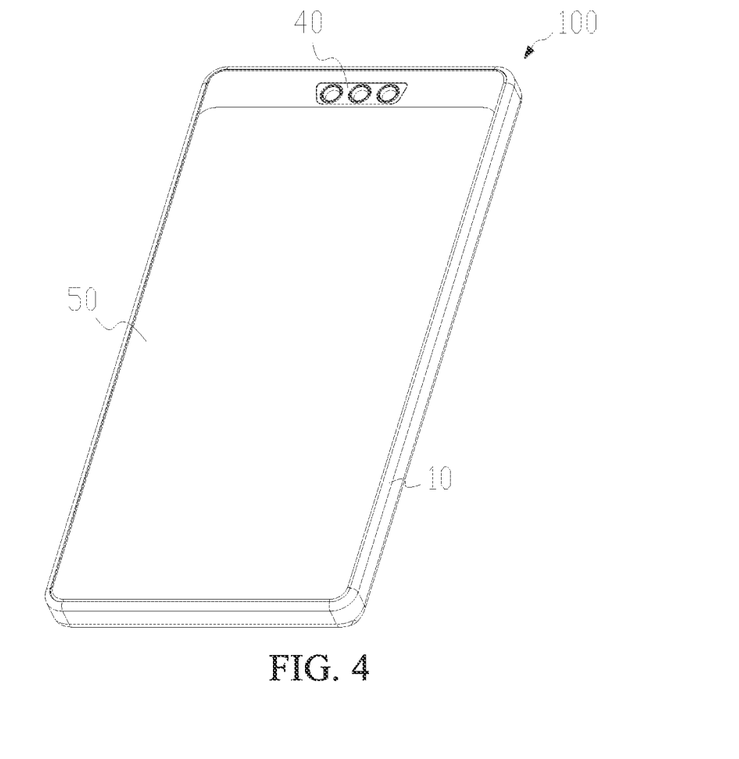
FIG. 4 is a schematic structural view illustrating the display device in a camera mode according to one embodiment of the present application.

Referring to FIGS. 3 and 4, when the display device 100 is in the non-camera mode, the panel 50 covers the camera module 40. When the display device 100 is in the camera mode, the camera module 40 is exposed.

In the embodiment of the present application, the frame structure 10, the cover plate 20, and the backplate 30 are used to define the space kj. Whether it is in a camera mode or a non-camera mode, the driving assembly 60 and the camera module 40 are arranged in the space kj, thereby reducing a risk of moisture entering into the display device 100.

Optionally, the panel 50 can be an organic light emitting diode panel, a quantum dot light emitting diode panel, a liquid crystal panel, or a micro light emitting diode panel, etc.

Optionally, the display device 100 of the present application further includes a rear camera module 101, a switching board 102, a button 103, an electronic device mounting board 104, a charging interface device 105, a mother circuit board 106, a first flexible circuit board 107, and a second flexible circuit board 108.

The mother circuit board 106 is connected to the button 103 through the first flexible circuit board 107. The mother circuit board is connected to the camera module 40 and/or the rear camera module 101 through the second flexible circuit board 108. The switching board 102 is disposed at one side of the mother circuit board 106. The charging interface device 105 is arranged at one side of the mother circuit board 106.

Figure 5:
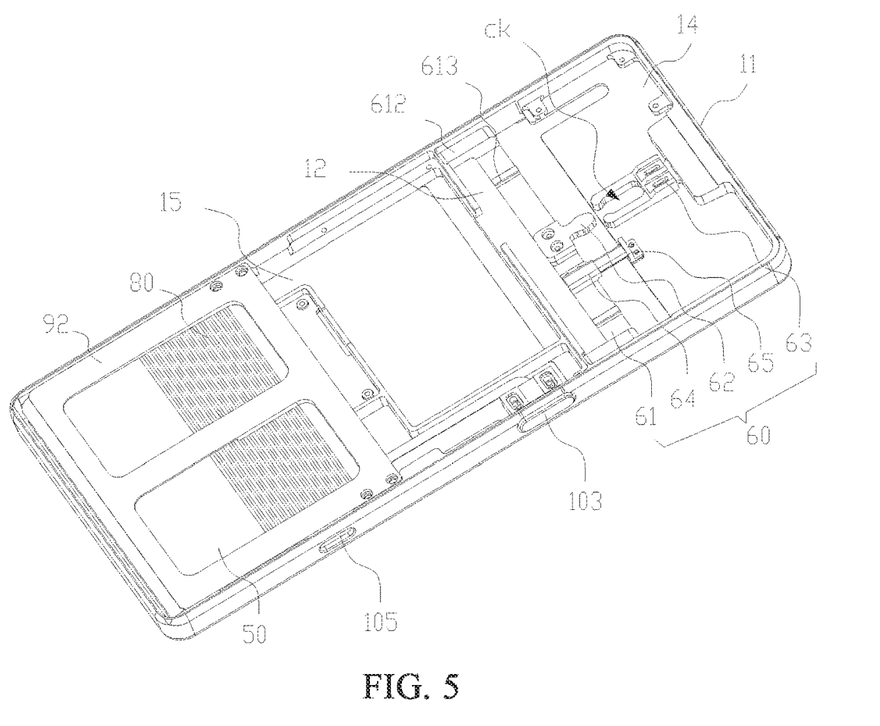
FIG. 5 is a partial structural view illustrating the display device in the non-camera mode according to one embodiment of the present application.
Figure 6:
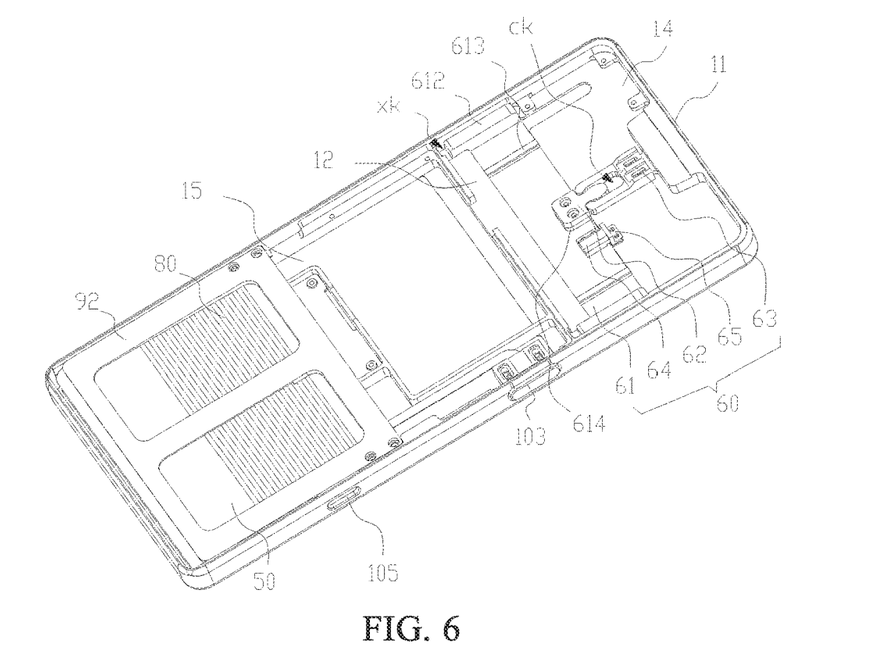
FIG. 6 is a partial structural view illustrating the display device in the camera mode according to one embodiment of the present application.

Optionally, as shown in FIG. 5 and FIG. 6, the driving assembly 60 includes a connecting member 61, a latch 62, a socket 63, a driving member 64, and a fastening member 65.

The connecting member 61 is connected to a back of the panel 50. The latch 62 is disposed on one side of the connecting member 61 away from the panel 50. The socket 63 is disposed on the frame structure 10. The socket 63 is provided with a slot ck for engagement with the latch 62.

The driving member 64 is connected to the fastening member 65. The driving member 64 is arranged on one of the connecting member 61 or the frame structure 10, and the fastening member 65 is arranged on the other one of the connecting member 61 or the frame structure 10.

In the present embodiment, the driving member 64 is arranged on the connecting member 61, and the fastening member 65 is arranged on the frame structure 10. In some embodiments, the driving member 64 is arranged on the frame structure 10, and the fastening member 65 is arranged on the connecting member 61.

Optionally, the connecting member 61 can be connected to the panel 50 through an adhesive. In some embodiments, the connecting member 61 can also use other mechanical structures to fix the panel 50.

The display device 100 of the present embodiment utilizes the driving member 64 to drive the panel 50 connected to the connecting member 61 to move, so that the panel 50 can cover and expose the camera module 40.

Specifically, when the display device 100 is in the camera mode, the driving member 64 is activated to drive the connecting member 61 to move away from the camera module 40, and the panel 50 also moves with the connecting member 61 until the panel 50 completely exposes the camera module 40. At this point, the latch 62 fixed on the connecting member 61 is disengaged from the socket 63 fixed on the frame structure 10, as shown in FIG. 5.

When the display device 100 is in the non-camera mode, the driving member 64 is activated to drive the connecting member 61 to move toward the camera module 40, and the panel 50 also moves with the connecting member 61 until the panel 50 covers the camera module 40. At this point, the latch 62 fixed on the connecting member 61 is inserted into the slot ck of the socket 63 fixed on the frame structure 10, and the latch 62 and the socket 63 are engaged with each other, as shown in FIG. 6.

Figure 7:
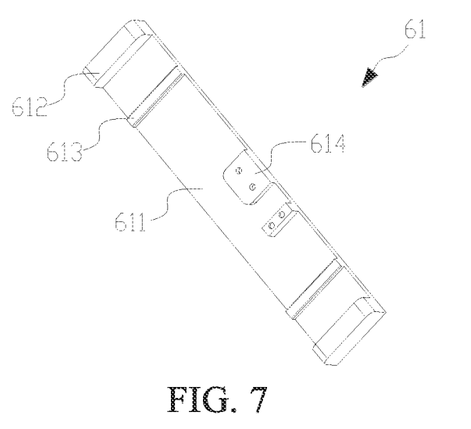
FIG. 7 is a schematic structural view of a connecting member of the display device according to one embodiment of the present application.

Optionally, as shown in FIG. 7, the connecting member 61 includes a first plate 611, a limiting wall 612, and a first guiding portion 613. The first plate 611 is fixedly connected to the back of the panel 50. The limiting wall 612 is disposed on one side of the first plate 611 away from the panel 50. The first guiding portion 613 is disposed on one side of the first plate 611 away from the panel 50.

Optionally, a protruding platform 614 protrudes from one side of the first plate 611 away from the cover plate 20. The latch 62 is disposed on the protruding platform 614 for precise installation of the latch 62 and the protruding platform 614. In addition, on the one hand, the arrangement of the protruding platform 614 makes the latch 62 and the socket 63 aligned with each other without a need to increase an overall thickness of the first plate 611, which saves materials.

Figure 8:
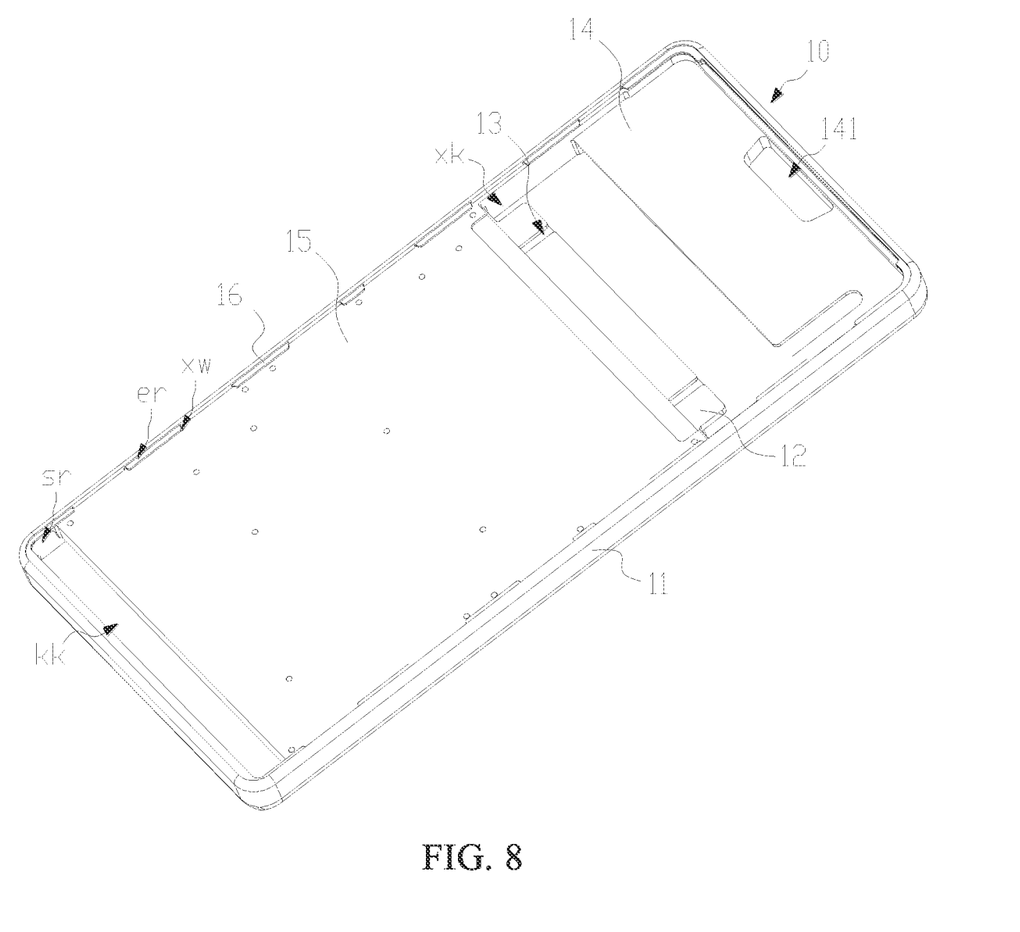
FIG. 8 is a schematic structural view of a frame structure of the display device according to one embodiment of the present application.

Referring to FIG. 8, the frame structure 10 includes a frame body 11, a first support portion 12, and a second guiding portion 13. The first support portion 12 is connected in the frame body 11. The second guiding portion 13 is disposed on the first support portion 12. The first plate 611 is disposed on the first support portion 12. The first support portion 12 is provided with a limiting opening xk. The limiting wall 612 is disposed in the limiting opening xk. The first guiding portion 613 and the second guiding portion 13 are slidably connected.

In the present embodiment, the limiting opening xk and the limiting wall 612 are used to limit positions, so as to realize precise installation of the connecting member 61 and the first support portion 12 and achieve precise sliding of the connecting member 61. The first guiding portion 613 and the second guiding portion 13 are slidably connected to achieve precise directional movement of the connecting member 61 and the panel 50.

Optionally, the first guiding portion 613 includes one of a guiding groove or a guiding block, and the second guiding portion 13 includes the other one of a guiding groove or the guiding block.

In the present embodiment, the first guiding portion 613 is the guiding block, and the second guiding portion 13 is the guiding groove. The first guiding portion 613 is slidably disposed in the second guiding portion 13. The collaboration of the guiding block and the guiding groove simplifies a sliding structure and can limit movement.

Figure 9:
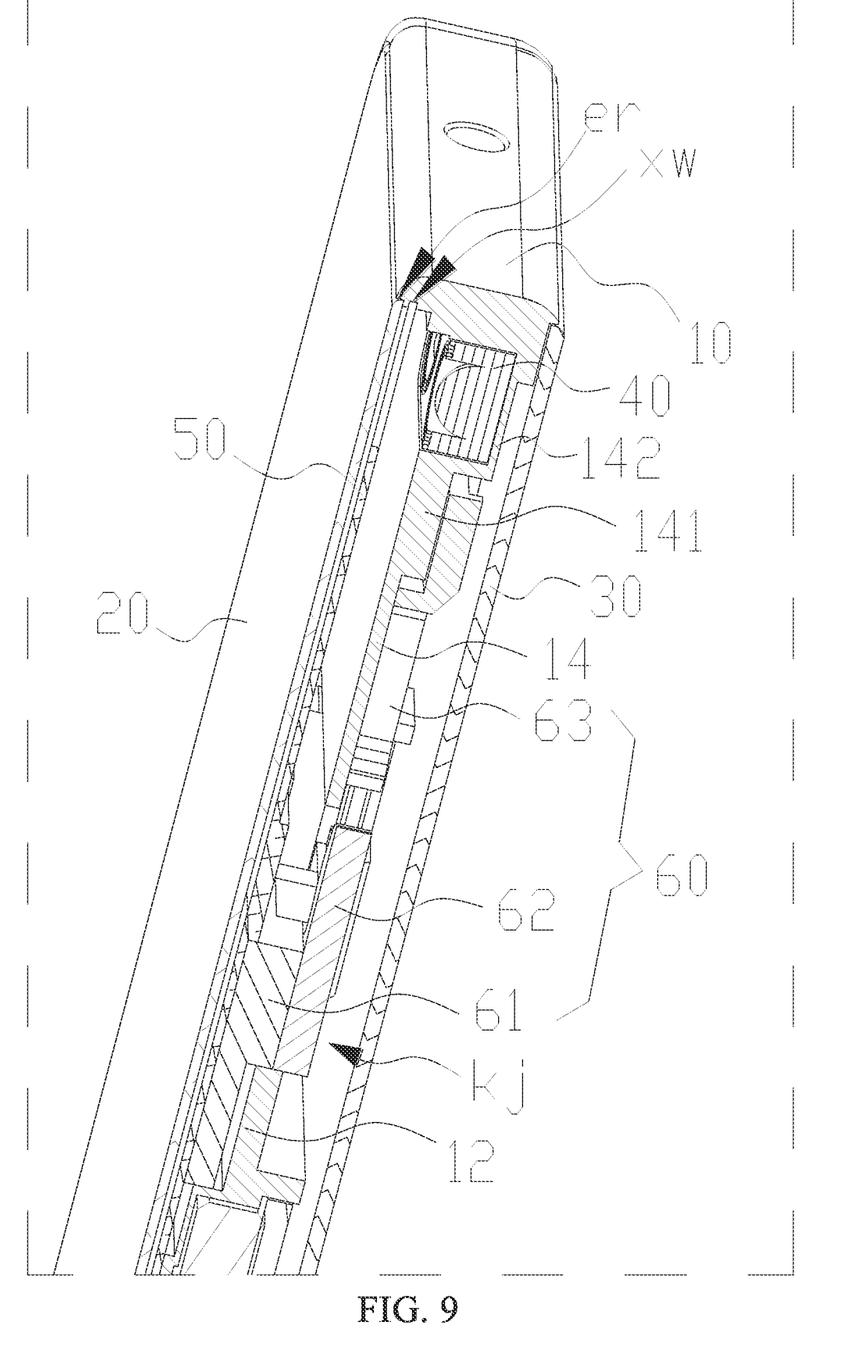
FIG. 9 is an enlarged view illustrating part A in FIG. 2.

Optionally, as shown in FIG. 9, the frame structure 10 can further include a second support portion 14. A recessed portion 141 is defined on one side of the second support portion 14 close to the cover plate 20. The recessed portion 141 is located on one side of the second support portion 14 away from the first support portion 12. The camera module 40 is disposed in the recessed portion 141.

Figure 10:
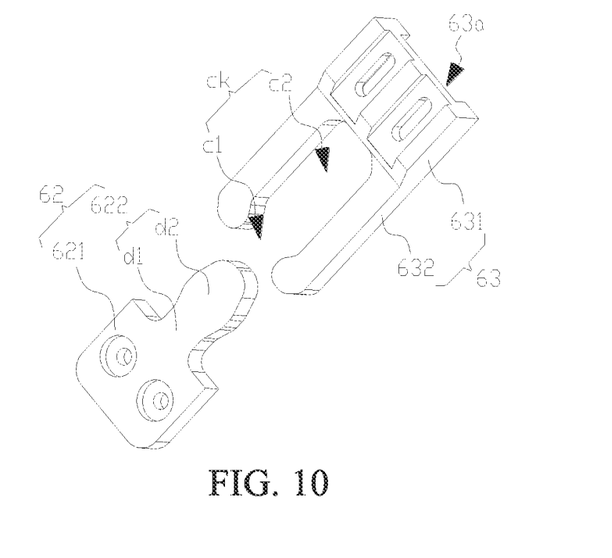
FIG. 10 is a schematic structural view illustrating detachment of a latch and a socket of the display device according to one embodiment of the present application.
Figure 11:
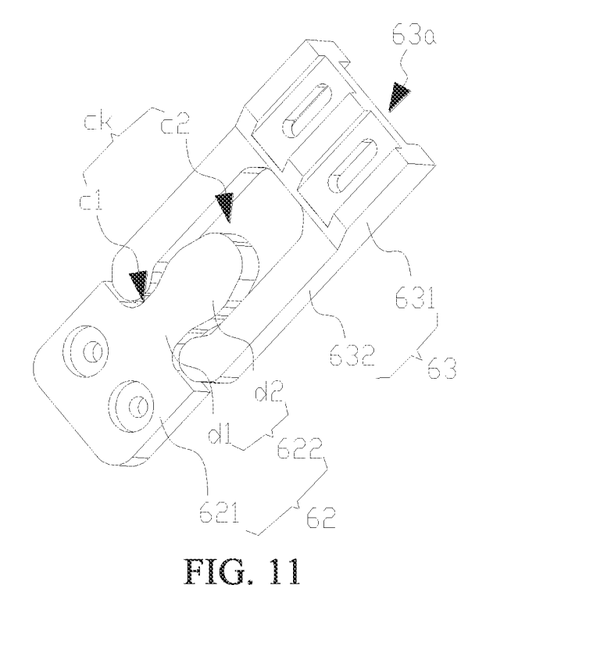
FIG. 11 is a schematic structural view illustrating engagement of the latch and the socket of the display device according to one embodiment of the present application.

Optionally, as shown in FIG. 10 and FIG. 11, the socket 63 includes a first base 631 and two resilient arms 632. The resilient arms 632 are connected at two ends of one side of the first base 631 close to the latch 62. The two resilient arms 632 define the slot ck. The slot ck includes a first region c1 close to the latch 62 and a second region c2 connected to one side of the first region c1 away from the latch 62. A width of the first region c1 is smaller than a width of the second region c2.

The latch 62 includes a second base 621 and a pin 622 connected to one side of the second base 621 close to the socket 63. The pin 622 includes a first portion d1 connected to the second base 621 and a second portion d2 connected to one side of the first portion d1 away from the second base 621. A width of the first portion d1 is less than a width of the second portion d2.

The first portion d1 is matched with the first region c1, and the second portion d2 is matched with the second region c2. The pin 622 is engaged with the slot ck.

The slot ck is designed to be narrow at a front and wide at a back to fit the pin 622 which is wide at a front and narrow at a back. As a result, when the pin 622 is inserted into the slot ck, the slot ck can be engaged with the pin 622 to achieve stable connection. This further improves stability of the panel 50 after the panel 50 is positioned.

Optionally, the second base 621 is disposed on the protruding platform 614 to facilitate precise installation of the second base 621 and the protruding platform 614. In addition, the arrangement of the protruding platform 614 makes the pin 622 suspended, which is convenient for the pin 622 to be inserted and matched with the slot ck.

Figure 12:
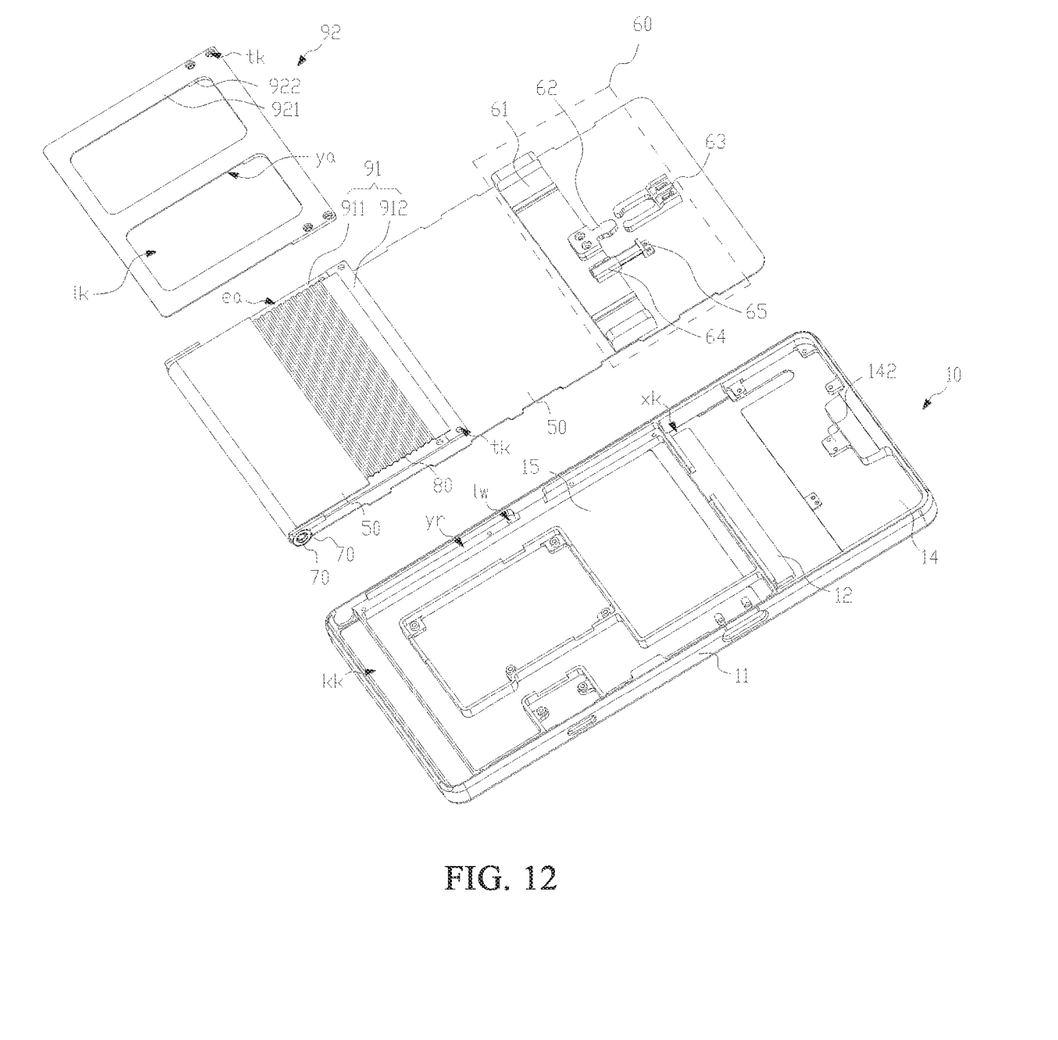
FIG. 12 is a partial exploded view of the display device according to one embodiment of the present application.

Optionally, as shown in FIG. 12, a positioning block 142 is disposed on one side of the second support portion 14 away from the cover plate 20. The first base 631 is provided with a positioning groove 63a. The positioning block 142 is arranged in the positioning groove 63a, so as to facilitate precise installation of the positioning block 142 and the positioning groove 63a.

Figure 13:
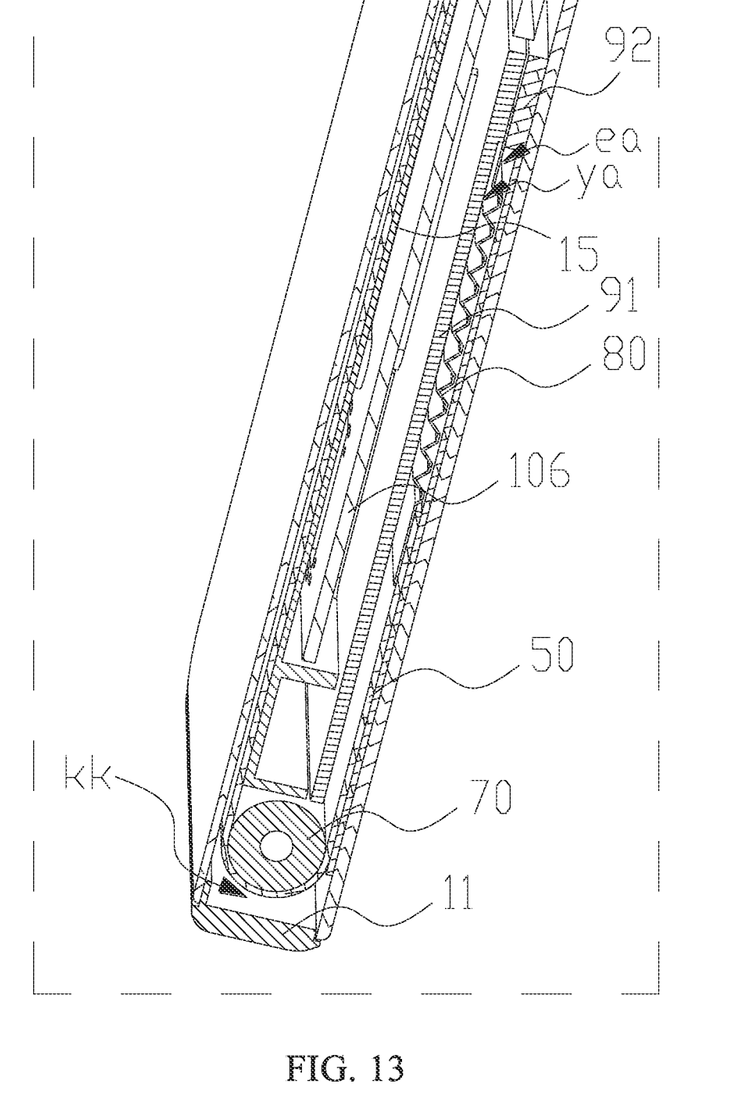
FIG. 13 is an enlarged view illustrating part C in FIG. 2.

Optionally, as shown in FIG. 12 and FIG. 13, the frame structure 10 further includes a third support portion 15 connected to one side of the first support portion 12 away from the camera module 40. A hole kk is defined between one side of the third support portion 15, away from the camera module 40, and the frame body 11.

The display device 100 includes a rotating shaft 70 and an elastic member 80. The rotating shaft 70 is disposed in the hole kk.

Optionally, the panel 50 is a flexible panel. The panel 50 is disposed on the third support portion 15 and is bent around an outer peripheral surface of the rotating shaft 70 to one side of the third support portion 15 away from the cover plate 20. The elastic member 80 is disposed on one side of the third support portion 15 away from the cover plate 20. One end of the elastic member 80 is connected to an end portion of the panel 50, and another end of the elastic member 80 is fixedly connected to the frame structure 10.

The elastic member 80 and the panel 50 are connected, and the panel 50 is in a straight state during a sliding and rolling process by means of pretension and resilience of the elastic member 80, which reduces a risk of bulging.

Figure 14:
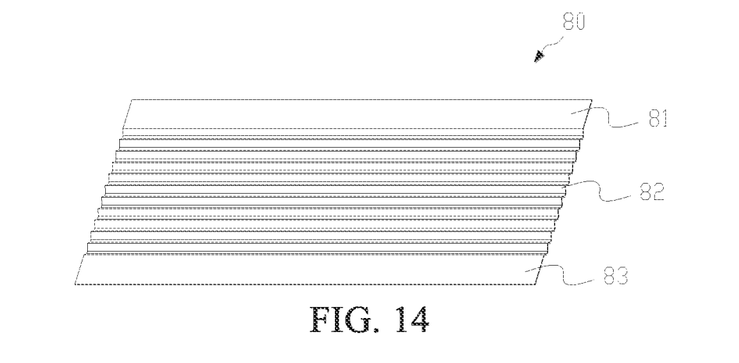
FIG. 14 is a schematic structural view illustrating an elastic member of the display device according to one embodiment of the present application.

Optionally, as shown in FIG. 14, the elastic member 80 includes a first end portion 81, an elastic portion 82, and a second end portion 83 which are connected in sequence. The first end portion 81 is connected to the panel 50, and the second end portion 83 is fixedly connected to the frame structure 10.

Optionally, the elastic portion 82 is substantially wavy or zigzag in shape, can also has a spring form, or can have other shapes with stretch elasticity.

Optionally, the elastic portion 82 is in a straight state to ensure that the panel 50 is always in the straight state.

Optionally, as shown in FIG. 12 and FIG. 13, the display device 100 further includes an auxiliary plate 91 and a pressing plate 92.

The auxiliary plate 91 is disposed between the elastic member 80 and the third support portion 15. The pressing plate 92 is disposed between the elastic member 80 and the backplate 30. The auxiliary plate 91 and the pressing plate 92 press the second end portion 83 of the elastic member 80 and are fixedly connected to the frame structure 10.

The auxiliary plate 91 and the pressing plate 92 press the second end portion 83 of the elastic member 80 to fix the elastic member 80. In addition, both the auxiliary plate 91 and the pressing plate 92 overlap with a portion of the panel 50 located at the third support portion 15 on one side close to the backplate 30, so as to protect the panel 50.

Optionally, sides of the pressing plate 92 and the auxiliary plate 91 facing the panel 50 are made of flexible materials, so that the panel 50 is further protected, and the pressing plate 92 and the auxiliary plate 91 can press with better stability on the second end portion 83.

In some embodiments, the second end portion 83 of the elastic member 80 can also be directly fixed on the frame body 11 and/or the third support portion 15 by means of, for example, screw connection, adhesives, engagement, or riveting.

Optionally, the pressing plate 92 includes a second plate 921 and a pressing portion 922 disposed on the second plate 921. The auxiliary plate 91 includes a third plate 911 and a pressing platform 912 disposed on the third plate 911. The second end portion 83 of the elastic member 80 is disposed between the pressing portion 922 and the pressing platform 912.

The pressing portion 922 and the pressing platform 912 are disposed corresponding to the elastic member 80. A surface of the second plate 921 facing the cover plate 20 and a side surface of the pressing portion 922 define a first recessed space ya. A surface of the third plate 911 facing the backplate 30 and a side surface of the pressing platform 912 define a second recessed space ea.

The first recessed space ya and the second recessed space ea are defined corresponding to a portion of the panel 50 close to the elastic member 80. This arrangement allows more space on upper and lower sides of the portion of the panel 50 close to the elastic member 80, which reduces a risk of the panel 50 being scratched by the auxiliary plate 91 and the pressing plate 92. In addition, the protruding pressing portion 922 and the pressing platform 912 have improved deformation capability, thereby providing increased pressing force on the second end portion 83 when pressing the second end portion 83.

Optionally, a first accommodating groove yr is defined on one side of the frame body 11 away from the cover plate 20. The pressing plate 92 and the auxiliary plate 91 are disposed in the first accommodating groove yr.

The pressing plate 92 and the auxiliary plate 91 are fixedly connected to the frame body 11 by means of threaded members (not illustrated). Specifically, the pressing plate 92 and the auxiliary plate 91 are both provided with corresponding through holes tk, a bottom of the first accommodating groove yr is provided with threaded holes lw, and the threaded member passes through the through holes tk to be fixedly connected to the threaded holes lw.

Optionally, the pressing plate 92 is provided with a hollow opening lk. The hollow opening lk partially exposes the elastic member 80 and the panel 50. Such an arrangement lightens the pressing plate 92 and makes it easy to observe installation of the pressing plate 92 and the elastic member 80.

Optionally, please refer to FIG. 2, FIG. 8, and FIG. 9, the frame structure 10 can further include a limiting member 16. The limiting member 16 is disposed on an inner side of the frame body 11 and is located on one side close to the cover plate 20.

A limiting space xw is formed between the limiting member 16 and a surface of the third support portion 15 close to the cover plate 20. The panel 50 is arranged in the limiting space xw.

One side of the limiting member 16 facing the cover plate 20 and an inner side surface of the frame body 11 form a second accommodating groove er. The cover plate 20 is arranged in the second accommodating groove er.

In the present embodiment, the limiting member 16 is used to divide the frame body 11 into two spaces, one space (i.e., the limiting space xw) is used to place a portion of the panel 50, and the other space (i.e., the second accommodating groove er) is used to place the cover plate 20, which simplifies the structure and saves space.

Optionally, there can be multiple limiting members 16. The limiting members 16 are arranged on the frame body 11 at intervals, and are arranged along an inner circumference of the frame body 11.

In some embodiments, there can be only one limiting member 16, and the limiting member 16 is extended along the inner circumference of the frame body 11.

It should be noted that the panel of the present application can also be a rigid panel. When the panel is a rigid panel, the rotating shaft 70, the elastic member 80, the pressing plate 92, and the auxiliary plate 91 can be saved. In this case, it is necessary to increase a length of the limiting space xw, in order to realize a sliding function of the panel and a full screen display function.

When the panel is a rigid panel, a face frame is also required to cover the part of the limiting space xw. In this case, when the panel covers the camera module, an interior of the display device is prevented from being exposed, and packaging performance is improved.

Optionally, one side of the frame body 11 away from the cover plate 20 is provided with a third accommodating groove sr. The third accommodating groove sr communicates with two sides of the hole kk.

The display device 100 includes guiding sleeves 93. The guiding sleeves 93 are sleeved on two sides of the rotating shaft 70, and the guiding sleeves 93 are installed in the third accommodating groove sr.

In the present embodiment, two ends of the rotating shaft 70 are sleeved in the guiding sleeves 93. The guiding sleeves 93 are arranged in the third accommodating groove sr to fix and position the rotating shaft 70.

Figure 15:
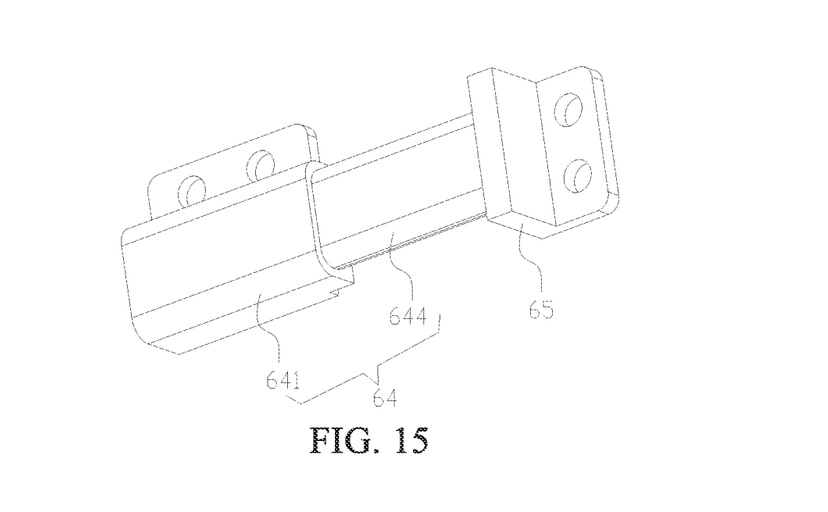
FIG. 15 is a schematic structural view illustrating collaboration of a driving member and a fastening member of the display device according to one embodiment of the present application.
Figure 16:
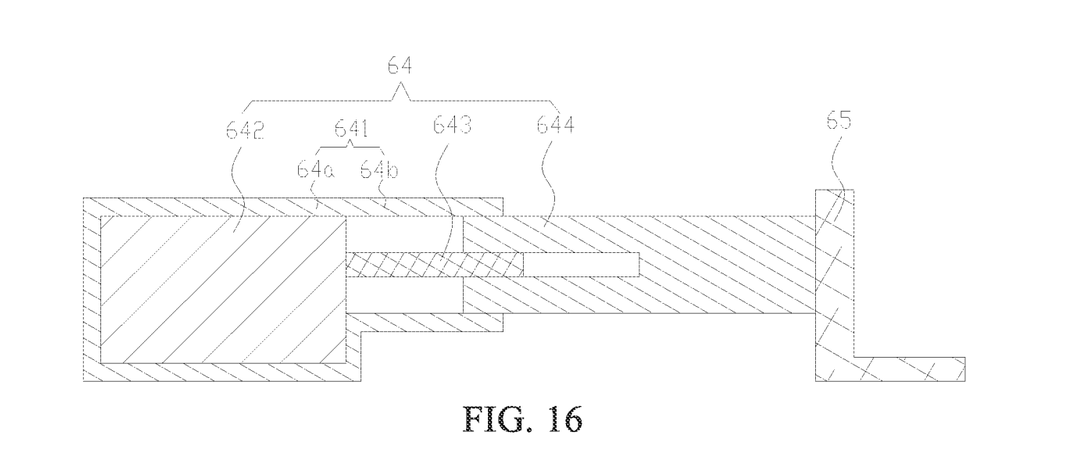
FIG. 16 is a schematic cross-sectional structural view illustrating collaboration of the driving member and the fastening member of the display device according to one embodiment of the present application.

Optionally, please refer to FIGS. 15 and 16, the driving member 64 includes a housing 641, a motor 642, a screw rod 643 connected to an output shaft of the motor 642, and a sleeve 644 threadedly connected to the screw rod 643. The sleeve 644 is fixedly connected to a fastening member 65.

The housing 641 includes a first cavity 64a and a second cavity 64b communicating with the first cavity 64a. The motor 642 is arranged in the first cavity 64a. The sleeve 644 is inserted in the second cavity 64b and is slidably connected with the second cavity 64b.

The sleeve 644 is provided with a threaded hole wk, and the screw rod 643 is threadedly connected with the threaded hole wk.

In some embodiments, the housing 641 and the sleeve 644 can also be omitted, and the screw rod 643 can be threadedly connected with the fastening member 65.

In some embodiments, the driving member 64 can also be driven by a non-motor manner with the screw rod, that is, for example, cylinder driving, transmission driving, and gear driving.

In the present application, a frame structure, a cover plate and a backplate are used to define a space. A camera module, a panel, and a driving assembly are arranged in the space. The driving assembly is connected to the panel, and the driving assembly is used to drive the panel to cover the camera module. When a display device is in a non-camera mode, the panel covers the camera module. When the display device is in a camera mode, the camera module is exposed.

That is to say, regardless of whether it is in the camera mode or in the non-camera mode, the driving assembly and the camera module are all arranged in the space, which reduces a risk of moisture entering the display device.

The display device of the present application has been described in detail above. The working principles and embodiments of the present application are described using specific examples. The descriptions of the above embodiments are only used for ease of understanding the methods and main ideas of the present application. Those skilled in the art can change the embodiments and the application range according to the ideas of the present application. In summary, the present disclosure should not be construed as a limitation to the present application.

What is claimed is:

1. A display device with a camera mode and a non-camera mode, wherein the display device comprises:
    a frame structure;
    a cover plate arranged on one side of the frame structure;
    a backplate arranged on another side of the frame structure, wherein the frame structure, the cover plate, and the backplate define a space;
    a camera module arranged in the space;
    a panel disposed within the space; and
    a driving assembly arranged in the space, wherein the driving assembly is configured to drive the panel to cover the camera module;
    wherein when the display device is in a non-camera mode, the panel covers the camera module; and when the display device is in the camera mode, the camera module is exposed;
    wherein the driving assembly comprises:
    a connecting member connected to a back of the panel;
    a latch disposed on one side of the connecting member away from the panel;
    a socket disposed on the frame structure, wherein the socket is provided with a slot for engagement connection with the latch;
    a driving member; and
    a fastening member, wherein the driving member is connected to the fastening member, the driving member is arranged on one of the connecting member or the frame structure, and the fastening member is arranged on the other one of the connecting member or the frame structure.

2. The display device according to claim 1, wherein the connecting member comprises a first plate, a limiting wall, and a first guiding portion;
    the first plate is fixedly connected to the back of the panel; the limiting wall is arranged on one side of the first plate away from the panel; the first guiding portion is arranged on one side of the first plate away from the panel;
    the frame structure comprises a frame body, a first support portion, and a second guiding portion; the first support portion is connected in the frame body, and the second guiding portion is disposed on the first support portion; the first plate is disposed on the first support portion; a limiting opening is defined in the first support portion, and the limiting wall is arranged in the limiting opening; and the first guiding portion and the second guiding portion are slidably connected to each other.

3. The display device according to claim 2, wherein the first guiding portion comprises one of a guiding groove or a guiding block, and the second guiding portion comprises the other one of the guiding groove or the guiding block.

4. The display device according to claim 2, wherein the socket comprises a first base and two resilient arms, the resilient arms are connected at two ends of one side of the first base close to the latch, the two resilient arms define the slot, the slot comprises a first region close to the latch and a second region connected to one side of the first region away from the latch, and a width of the first region is less than a width of the second region;
    the latch comprises a second base and a pin connected to one side of the second base close to the socket, the pin comprises a first portion connected to the second base and a second portion connected to one side of the first portion away from the second base, and a width of the first portion is less than a width of the second portion; and
    the first portion is matched with the first region, the second portion is matched with the second region, and the pin is engaged with the slot.

5. The display device according to claim 4, wherein the frame structure further comprises a second support portion, a positioning block is disposed on one side of the second support portion away from the cover plate, the first base is provided with a positioning groove, and the positioning block is arranged in the positioning groove; and
    a protruding platform protrudes from one side of the first plate away from the cover plate, and the second base is disposed on the protruding platform.

6. The display device according to claim 5, wherein a recessed portion is defined on one side of the second support portion close to the cover plate, the recessed portion is located on one side of the second support portion away from the first support portion, and the camera module is arranged in the recessed portion.

7. The display device according to claim 1, wherein the driving member comprises a housing, a motor, a screw rod connected to an output shaft of the motor, and a sleeve threadedly connected with the screw rod; the sleeve is fixedly connected to the fastening member;

the housing comprises a first cavity and a second cavity communicating with the first cavity, the motor is arranged in the first cavity; the sleeve is inserted in the second cavity and is slidably connected with the second cavity; and the sleeve is provided with a threaded hole, and the screw rod is threadedly connected with the threaded hole.

8. The display device according to claim 2, wherein the frame structure further comprises a third support portion connected to one side of the first support portion away from the camera module; a hole is defined between one side of the third support portion, away from the camera module, and the frame body;

the display device comprises a rotating shaft and an elastic member, the rotating shaft is disposed in the hole, the panel is a flexible panel, and the panel is disposed on the third support portion and is bent around an outer peripheral surface of the rotating shaft to one side of the third support portion away from the cover plate; the elastic member is disposed on one side of the third support portion away from the cover plate;

and one end of the elastic member is connected to an end portion of the panel, and another end of the elastic member is fixedly connected to the frame structure.

9. The display device according to claim 8, wherein the elastic member comprises a first end portion, an elastic portion, and a second end portion which are connected in sequence, the first end portion is connected to the panel, and the second end portion is fixedly connected to the frame structure.

10. The display device according to claim 9, wherein the display device further comprises an auxiliary plate and a pressing plate; the auxiliary plate is disposed between the elastic member and the third support portion; the pressing plate is disposed between the elastic member and the backplate; and the auxiliary plate and the pressing plate press the second end portion of the elastic member and are fixedly connected to the frame structure.

11. The display device according to claim 10, wherein the pressing plate comprises a second plate and a pressing portion disposed on the second plate; the auxiliary plate comprises a third plate and a pressing platform disposed on the third plate; and the second end portion of the elastic member is disposed between the pressing portion and the pressing platform.

12. The display device according to claim 11, wherein the pressing portion and the pressing platform are disposed corresponding to the elastic member; a surface of the second plate facing the cover plate and a side surface of the pressing portion define a first recessed space; a surface of the third plate facing the backplate and a side surface of the pressing platform define a second recessed space; and the first recessed space and the second recessed space are defined corresponding to a portion of the panel close to the elastic member.

13. The display device according to claim 10, wherein a first accommodating groove is defined on one side of the frame body away from the cover plate, and the pressing plate and the auxiliary plate are disposed in the first accommodating groove; and the pressing plate and the auxiliary plate are fixedly connected to the frame body through a plurality of threaded members.

14. The display device according to claim 10, wherein a hollow opening is defined in the pressing plate, and the hollow opening exposes a portion of the elastic member and a portion of the panel.

15. The display device according to claim 10, wherein sides of the pressing plate and the auxiliary plate facing the panel are made of a flexible material.

16. The display device according to claim 8, wherein the frame structure further comprises a limiting member, and the limiting member is disposed on an inner side of the frame body and is located on one side close to the cover plate;

a limiting space is formed between the limiting member and a surface of the third support portion close to the cover plate, and the panel is arranged in the limiting space; and one side of the limiting member facing the cover plate and an inner side surface of the frame body form a second accommodating groove, and the cover plate is arranged in the second accommodating groove.

17. The display device according to claim 15, wherein one side of the frame body away from the cover plate is provided with a third accommodating groove, and the third accommodating groove communicates with two sides of the hole; and the display device comprises guiding sleeves, the guiding sleeves are sleeved on two sides of the rotating shaft, and the guiding sleeves are installed in the third accommodating groove.

18. The display device according to claim 1, wherein the display device further comprises a rear camera module, a switching board, a button, an electronic device mounting board, a charging interface device, a mother circuit board, a first flexible circuit board, and a second flexible circuit board;

the mother circuit board is connected to the button through the first flexible circuit board; the mother circuit board is connected to the camera module and/or the rear camera module through the second flexible circuit; the switching board is disposed at one side of the mother circuit board; and the charging interface device is arranged at one side of the mother circuit board.

* * * * *